US007993233B2

(12) United States Patent
Gassmann et al.

(10) Patent No.: US 7,993,233 B2
(45) Date of Patent: Aug. 9, 2011

(54) FRICTION COUPLING WITH ACTUATOR AND A BALL BEARING

(75) Inventors: Theodor Gassmann, Siegburg (DE);
Mark Schmidt, Koenigswinter (DE);
Andreas Pottharst, Koenigswinter (DE); Kurt Mueller, Merzenich (DE)

(73) Assignee: GKN Driveline International, GmbH, Lohmar (DE)

( * ) Notice: Subject to any disclaimer, the term of this patent is extended or adjusted under 35 U.S.C. 154(b) by 0 days.

(21) Appl. No.: 12/731,897

(22) Filed: Mar. 25, 2010

(65) Prior Publication Data
US 2010/0222175 A1   Sep. 2, 2010

Related U.S. Application Data

(63) Continuation of application No. 11/612,605, filed on Dec. 19, 2006, now Pat. No. 7,699,740.

(30) Foreign Application Priority Data

Dec. 20, 2005  (DE) .................. 10 2005 061 268

(51) Int. Cl.
F16J 37/08    (2006.01)
F16D 19/00    (2006.01)

(52) U.S. Cl. ...................... 475/205; 192/93 A

(58) Field of Classification Search .............. 192/84.6, 192/84.7, 93 A, 70.23; 475/205, 204, 231, 475/238, 239, 249
See application file for complete search history.

(56) References Cited

U.S. PATENT DOCUMENTS

| 4,371,341 | A | | 2/1983 | Nakanishi | |
|---|---|---|---|---|---|
| 4,950,214 | A | * | 8/1990 | Botterill | 475/231 |
| 5,651,437 | A | * | 7/1997 | Organek et al. | 192/35 |
| 5,819,883 | A | * | 10/1998 | Organek et al. | 188/71.5 |
| 5,910,061 | A | * | 6/1999 | Organek et al. | 475/149 |
| 5,960,916 | A | * | 10/1999 | Organek et al. | 192/35 |
| 6,120,407 | A | * | 9/2000 | Mimura | 475/225 |
| 6,250,445 | B1 | | 6/2001 | Davis | |
| 6,719,662 | B2 | * | 4/2004 | Forrest et al. | 475/231 |
| 6,758,782 | B2 | * | 7/2004 | Matzschker et al. | 475/218 |
| 6,827,663 | B2 | * | 12/2004 | Tucker-Peake | 475/231 |
| 6,848,550 | B2 | | 2/2005 | Puiu et al. | |
| 7,004,876 | B2 | * | 2/2006 | Puiu | 475/205 |
| 7,021,442 | B2 | | 4/2006 | Borgerson et al. | |
| 7,258,187 | B2 | * | 8/2007 | Bowen | 180/248 |
| 7,699,740 | B2 | * | 4/2010 | Gassmann et al. | 475/204 |
| 2006/0172845 | A1 | | 8/2006 | Gassmann et al. | |
| 2006/0213747 | A1 | * | 9/2006 | Matzschker | 192/84.6 |

FOREIGN PATENT DOCUMENTS

| DE | 4111296 A1 | 10/1992 |
|---|---|---|
| WO | WO-2005/035294 A1 | 4/2005 |
| WO | WO2005012751 A1 * | 5/2005 |
| WO | WO-2005/064179 A1 | 7/2005 |

* cited by examiner

Primary Examiner — Roger Pang
(74) Attorney, Agent, or Firm — Rader, Fishman & Grauer PLLC

(57) ABSTRACT

A friction coupling assembly includes: an actuator in the form of a ball ramp assembly, a plate package, and a ball bearing. The actuator has two coaxial discs, wherein the faces of the two discs each have ball grooves of increasing depth. Pairs of opposed ball grooves hold balls to axially support the two discs. The plate package is arranged coaxially relative to the discs and has outer plates for fixing to a coupling carrier and inner plates for fixing to a coupling hub. The ball bearing is for axially supporting the at least one rotatingly drivable disc, wherein a first bearing race of the ball bearing is integrally formed with the at least one rotatingly drivable disc.

12 Claims, 5 Drawing Sheets

FIG. 5

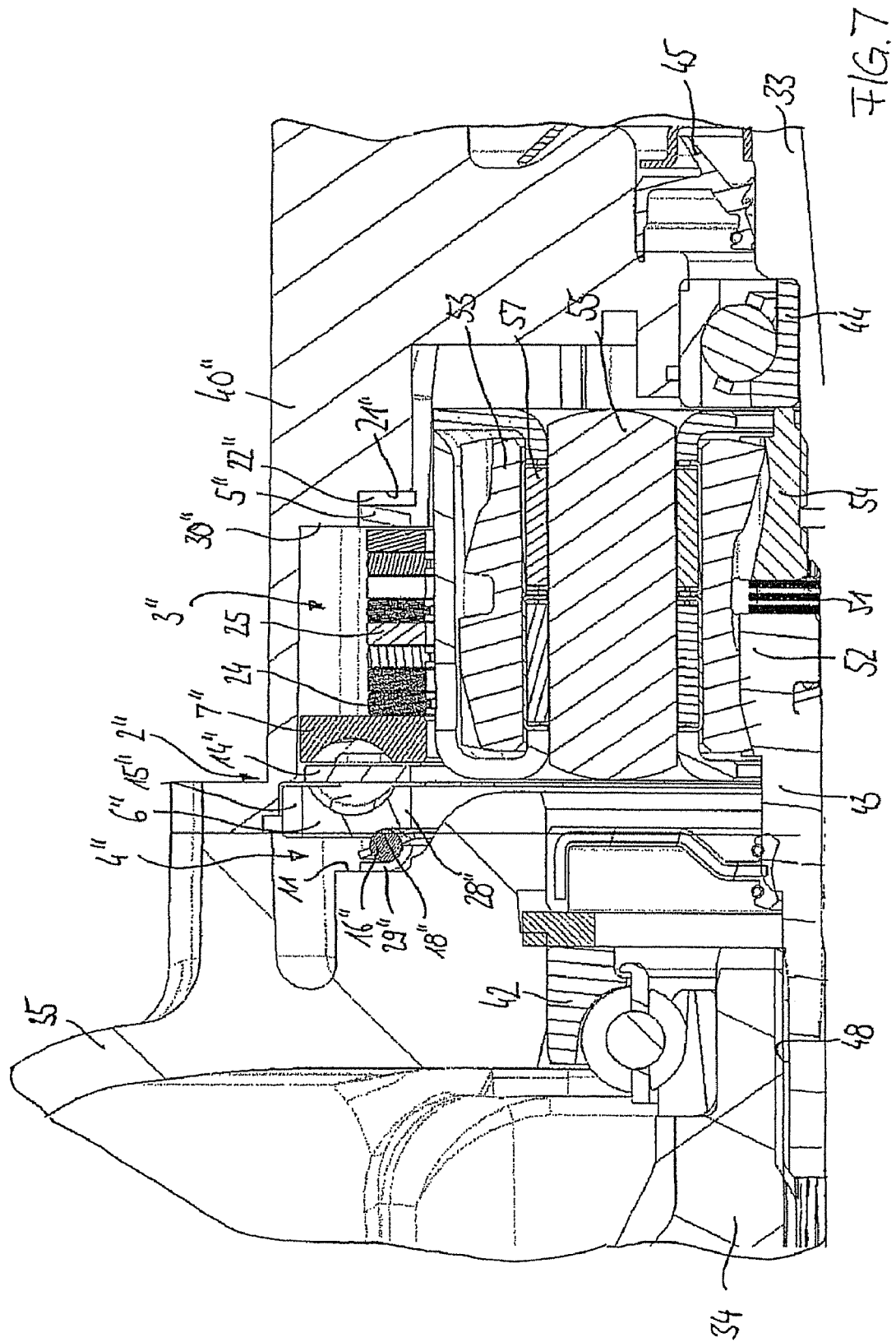

FRICTION COUPLING WITH ACTUATOR AND A BALL BEARING

CROSS REFERENCE TO RELATED APPLICATIONS

This application is a continuation application and claims priority to U.S. Ser. No. 11/612,605 filed on Dec. 19, 2006, now U.S. Pat. No. 7,699,740 which claims priority to German Application No. 102005061268.7 filed on Dec. 20, 2005, said applications are hereby incorporated by reference in their entireties.

TECHNICAL FIELD

The invention relates to an assembly having a friction coupling and an actuator. More particularly, the invention relates to a friction coupling and actuator for use in the driveline of a motor vehicle.

BACKGROUND OF THE INVENTION

The friction coupling comprises a set of coupling plates which are alternately, in a rotationally fast and axially displaceable way, connected to the one and the other of two coupling parts which are rotatable relative to one another, and which rest against an axially fixed abutment disc and which can be loaded by an axially displaceable pressure disc. For this purpose, the actuator comprises two discs which are rotatable relative to one another, one of which is axially supported relative to a fixed housing and the other one of which is axially displaceable. In their end faces facing one another, the two discs comprise ball grooves whose pitches extend in opposite directions. Each two opposed ball grooves which extend in opposite directions form a pair each of which accommodates a ball via which the discs are axially supported. The depth of each pair of ball grooves is variable around the circumference, so that a rotation of the discs relative to one another leads to the multi-plate coupling being axially displaced and thus actuated.

From WO 2005/035294 A1 there is known a drive assembly of a motor vehicle with two driven axles which can each be connected via a friction coupling to an output shaft of the manual gearbox. For actuating the friction couplings, an actuator system is provided which comprises two driven ball screw drives. The ball screw drives each comprise a nut and a spindle of which one component is operatively connected to an associated plate package. The transmission of force from the nut and spindle, respectively, to the plate package is effected via an intermediate axial bearing and spring.

U.S. Publication No. 2006/213747 proposes an axial setting device in the form of a ball ramp assembly which comprises a plate spring transmission wherein there is provided a first pressure plate which is acted upon by the axially displaceable disc of the ball ramp assembly, as well as a second pressure plate which loads the friction coupling. Between the two pressure plates, a plate spring is arranged which is incorporated in such a way that, by a lever effect, force is transmitted from the first to the second pressure plate.

DE 41 11 296 describes an axial setting device in the form of a ball ramp assembly for a friction coupling. Between the axially displaceable disc and the plate package, a needle bearing, a ring and a pressure pin are axially arranged in series. To return the axially displaceable disc, a plate spring is provided functionally in parallel thereto, which plate spring is located between the ring and the coupling carrier.

To control the driving dynamics of a motor vehicle so as to meet existing requirements, it is desirable to have very fine control of the respective friction coupling. Different heat expansion coefficients of the coupling components can lead to a changed reaction behavior of the friction coupling. Present friction coupling assemblies do not adequately address the effect of thermal expansion on the behavior of the coupling. Thus, there is a need for an improved coupling.

SUMMARY OF THE INVENTION

The present invention provides a friction coupling with an actuator, more particularly to be used in the driveline of a motor vehicle, which is less susceptible to interference from thermal expansion and which allows fine control of the friction coupling as compared to prior designs.

The present invention provides a friction coupling with an actuator, which can be used in the driveline of a motor vehicle, having the following components being arranged in series between two axially fixed supporting faces: an actuator in the form of a ball ramp assembly with two discs which are arranged coaxially relative to one another, of which at least one is rotatably drivable around an axis of rotation and of which one is axially supported and the other one is axially displaceable, wherein the two discs, on their end faces facing one another, each comprise a plurality of ball grooves which, in opposed circumferential directions, comprise an increasing depth, wherein in pairs of opposed ball grooves, balls are received via which the two discs are axially supported; a plate package arranged coaxially relative to the discs and having outer plates to be connected in a rotationally fixed way to a coupling carrier and inner plates to be connected in a rotationally fixed way to a coupling hub which is rotatable relative to the coupling carrier, wherein the outer plates and the inner plates are arranged so as to alternate in the axial direction; and a ball bearing for axially supporting the at least one rotatingly drivable disc, wherein a first bearing race of the ball bearing is integrally formed with at least one rotatingly driveable disc.

An advantage of the inventive assembly comprising a friction coupling and an actuator is that it is less susceptible to interference and thus permits a very fine control of the friction coupling. If the plate spring is arranged in the force flow between the axially supported disc and the plate package, the entire assembly comprises a higher degree of elasticity, the result being that the characteristic curve for the coupling moment as a function of the angle of rotation of the setting disc is flatter and that the thermal expansion of the participating components has less of an effect on the coupling moment generated. This means that the coupling moment can be set to meet existing requirements, thereby providing an improved controllability of the driving dynamics of the motor vehicle. The inventive assembly is suitable for universal application, for instance it can be used in a differential drive to achieve variable distribution of torque between the two sideshafts. Furthermore, the friction coupling and actuator can be used as a lock in a differential drive and also in the form of a so-called hang-on coupling which serves to optionally connect a further driveline which is drivable in addition to a permanently driven driveline.

According to a further embodiment, a ball bearing rotatably supports the rotatingly drivable disc, with the bearing race of the ball bearing being integrally formed with the rotatingly drivable disc. This results in fewer number of parts and an axially compact design of the assembly, which, in turn, has an advantageous effect on the production costs. According to an advantageous embodiment, the axially displaceable disc is held so as to be centered on the axis of rotation entirely by the balls of the ball ramp assembly, so that there is no need for any additional bearing mechanism. The at least one rotatingly drivable disc can be driven by an electric motor.

According to an embodiment, the first bearing race is formed in an end face of the rotatingly drivable disc, which faces away from the axially displaceable disc.

According to a further embodiment, the ball bearing comprises a second bearing race, which is axially supported against a first supporting face.

According to a further embodiment, the balls of the ball bearing are smaller than the balls of the balls of the ball ramp assembly. Furthermore, it is advantageous if the axially supported disc has a central bore, wherein the first bearing race is formed radially in a region between the central bore and a portion of the axially supporting disc, which is defined by a greatest groove depth of the ball grooves.

According to a further embodiment, the centers of the balls of the ball bearing define a first diameter and the centers of the balls of the ball ramp assembly define a second diameter, wherein the first diameter is smaller than the second diameter.

The plate spring comprises a conical pressure face which axially loads the plate package by means of an annular portion, wherein the plate spring is designed in such a way that the annular portion is positioned approximately radially in the region of the central friction radius of the plate package. For introducing force into the plate package, it is advantageous if the annular portion is located radially in the region of a central third of the radial extension of the friction faces of the coupling plates. In the unactuated condition of the ball ramp assembly, the plate package is first loaded by a smaller annular face of the pressure face of the plate spring. When the ball ramp assembly is actuated, which results in an increasing axial force, the size of the annular face increases which at least indirectly loads the plate package. The plate spring can also be designed in such a way that it comprises linear characteristics in the entire operating range of the friction coupling. This means that the friction coupling can be controlled in a particularly accurate way. The plate spring can be designed and arranged in such a way that, depending on the mounting conditions, the conical pressure face opens radially outwardly or radially inwardly.

According to a first embodiment, the axially supported disc is rotatingly drivable, whereas the axially displaceable disc is held in a rotationally fast way relative thereto, with the rotatingly drivable disc being supported by the ball bearing relative to the first supporting face so as to be rotatable around the axis of rotation. The ball bearing can be provided in the form of an axial angular contact ball bearing which centers the rotatable disc both axially and radially on the axis of rotation. A compact design results because a bearing race of the ball bearing is formed in the rotatable disc. In another embodiment, a spring is provided axially between the displaceable disc and the second supporting face. The spring acts against the spring force of the plate spring and thus serve to return the displaceable disc.

According to a first variant of the first embodiment, the plate spring is arranged axially between the displaceable disc and the plate package, with the plate spring being supported directly on the displaceable disc. Between the plate spring and the plate package, there can be arranged a pressure plate which introduces the axial force into the plate package. According to a further embodiment, a centering mechanism for centering the plate spring on the axis of rotation is provided. The centering mechanism can be arranged on the reverse side of the displaceable disc or on the pressure plate.

The centering mechanism can be provided, for example, in the form of an annular recess or an axial projection in an end face of said components.

According to a second variant of the first embodiment, the plate spring is arranged between the plate package and the second supporting face positioned opposite the first supporting face. The plate spring can be supported either directly on the second supporting face or indirectly via a pressure plate. This variant can also comprise centering mechanism for centering the plate spring. The centering mechanism can be provided in the form of an annular recess in the second supporting face, in which the plate spring and, optionally, the pressure plate are positioned.

According to a second embodiment, the axially supported disc is held in a rotationally fast way relative to the first supporting face, whereas the axially displaceable disc is rotatingly drivable. The plate spring can be arranged axially between the rotatingly drivable disc and the plate package, with the plate spring being rotatably supported by the ball bearing relative to the rotatingly drivable disc. The plate package, in turn, is axially supported on the second supporting face positioned opposite the first supporting face.

According to another embodiment, the ball bearing is provided in the form of an axial deep groove ball bearing, which is particularly advantageous because the balls, if viewed in a longitudinal section, form defined pressure points around which the plate spring is able to pivot in order to load the plate package. The ball bearing can also comprise a cage in which the balls are held so as to be circumferentially distributed. As already described above, a first bearing race of the ball bearing is formed by the rotatingly drivable disc, i.e. in an end face of said disc, which end face faces the plate spring, there is formed a first bearing groove in which there run the balls of the ball bearing run. According to a further embodiment, the second bearing race of the ball bearing is integrally formed with the plate spring. For this purpose, the plate spring, in its end face facing the ball ramp assembly, comprises a second bearing groove in which the balls of the ball bearing run. This embodiment is advantageous in that the plate spring is held in a centered way relative to the rotatingly drivable disc entirely via the balls of the ball bearing. There is thus no need for an additional radial bearing, so that, overall, there is achieved a compact design with a fewer number of parts. Furthermore, the balls of the axial ball bearing can be positioned on approximately the same radius as the balls of the ball ramp assembly. This results in a direct introduction of force from the displaceable disc to the plate spring, with the bending moments in the setting disc being low. The bearing groove of the plate spring can be positioned on a greater radius than the annular portion of the pressure face which loads the plate package.

According to yet a further embodiment, the plate package comprises a pressure plate which, on the one hand, is axially loaded by the plate spring and, on the other hand, by a spring for returning the ball ramp assembly. The return spring comprises a plurality of helical springs which are distributed around the circumference of the pressure plate. At their ends positioned opposite the pressure plate, the helical springs are supported relative to the supporting face, for instance the supporting face of a stationary housing or relative to a plate in contact with the supporting face.

A further solution provides a differential assembly for variably distributing torque in the driveline of a motor vehicle, comprising a differential drive with a rotatingly drivable differential carrier and two sideshafts which are supported on an axis of rotation and which are drivingly connected to the differential carrier via a differential gear set, wherein there is formed a first driveline between the differential carrier and each one of the sideshafts; per sideshaft, a transmission stage which is drivingly connected to the differential carrier on the one hand and to one of the sideshafts on the other hand and which forms part of a second driveline which is functionally parallel relative to the first driveline; per transmission stage, an assembly comprising a friction coupling with an actuator for connecting and disconnecting the second driveline.

The friction coupling with actuator is designed in accordance with one of the above-mentioned embodiments. The inventive differential assembly has the same advantages as the above-mentioned first solution, i.e. a particularly low susceptibility to interference and fine control of the friction coupling. As a result of the elasticity of the entire assembly consisting of the actuator and friction coupling, the characteristic curve of the coupling moment as a function of the angle of rotation of the setting disc is flatter. This means that the coupling moment can be set accurately to meet existing requirements, and that the driving dynamics can be set more easily.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

FIG. 5 is a longitudinal section through an inventive drive assembly having an inventive friction coupling with actuator according to FIG. 1.

FIG. 7 is half a longitudinal section through an inventive friction coupling with actuator in a third embodiment in a condition as part of a drive assembly, in the form of a detail, according to an embodiment of the invention.

DETAILED DESCRIPTION OF THE DRAWINGS

Figure 1:
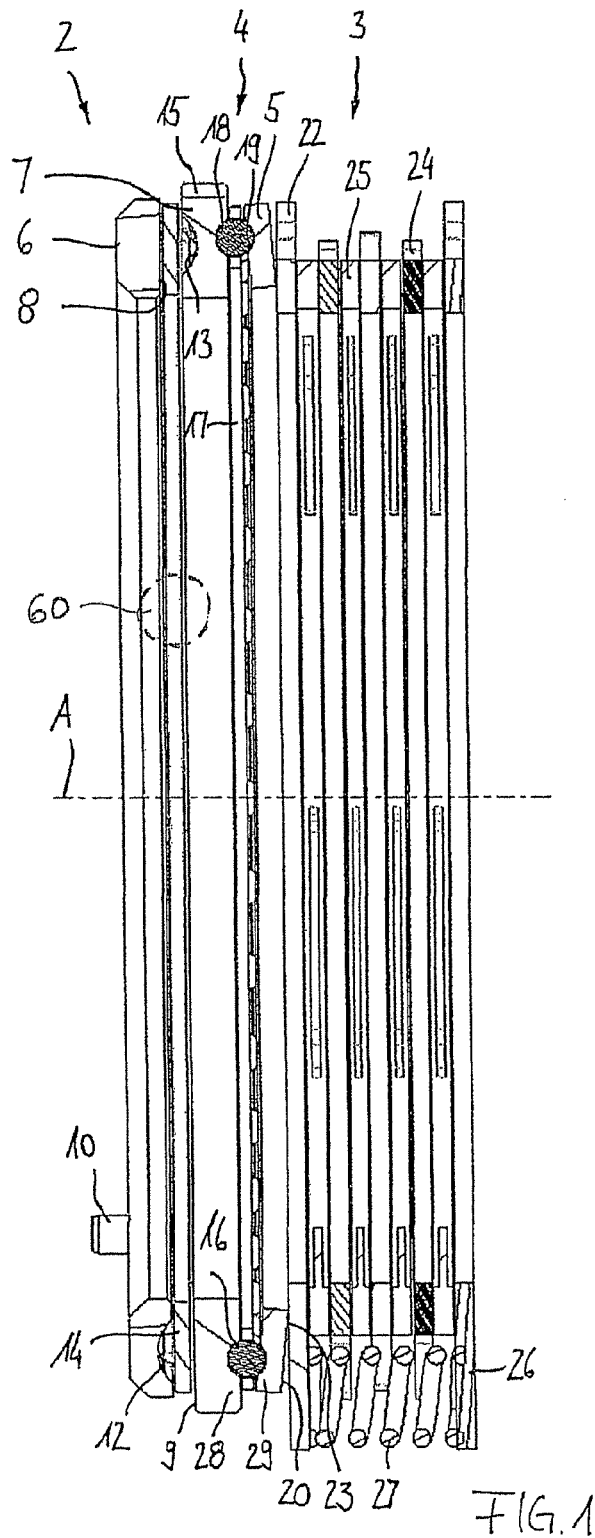
FIG. 1 is a longitudinal section through a friction coupling with an actuator in a first embodiment.
Figure 2:
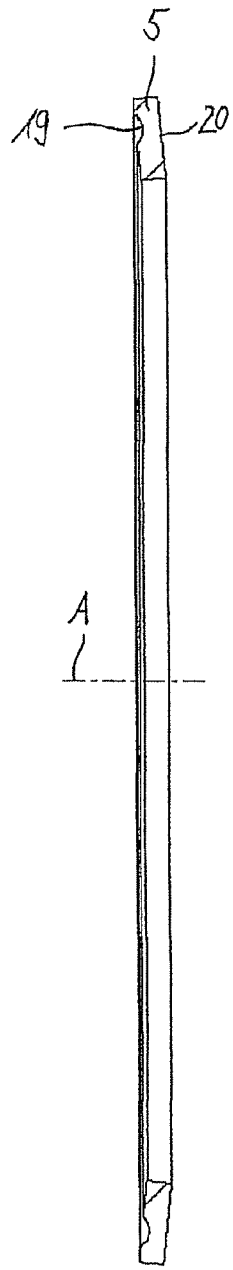
FIG. 2 shows the plate spring according to FIG. 1 in a longitudinal section.
Figure 4:
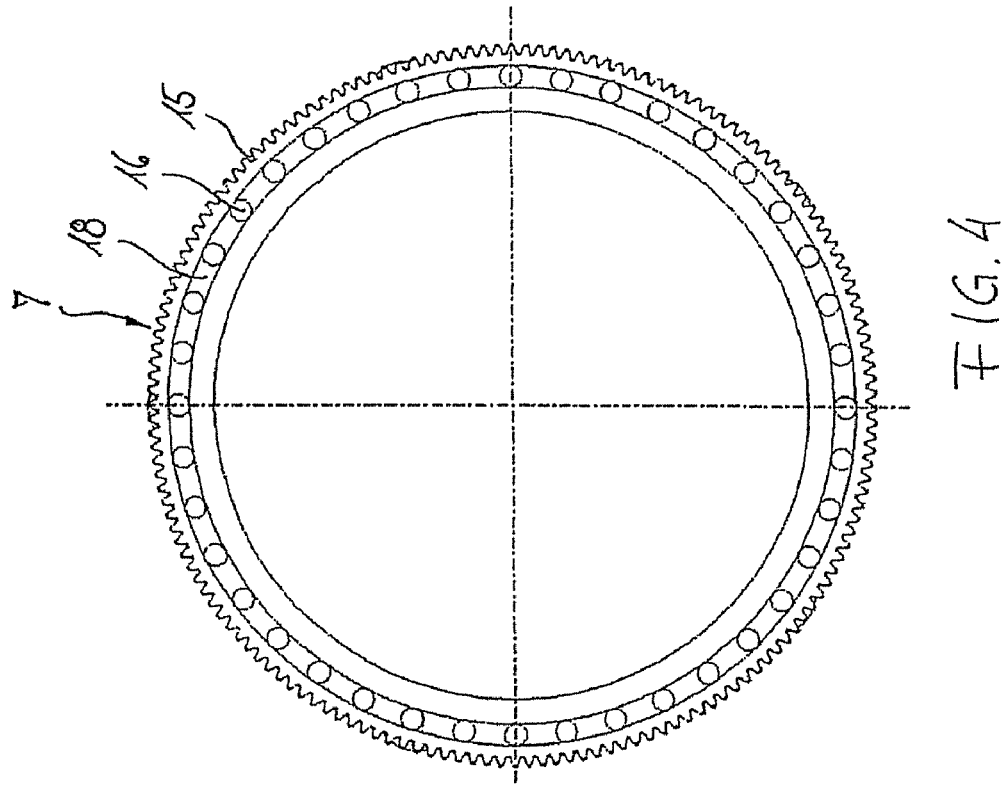
FIG. 4 is a plan view of the displaceable disc according to FIG. 1.
Figure 3:
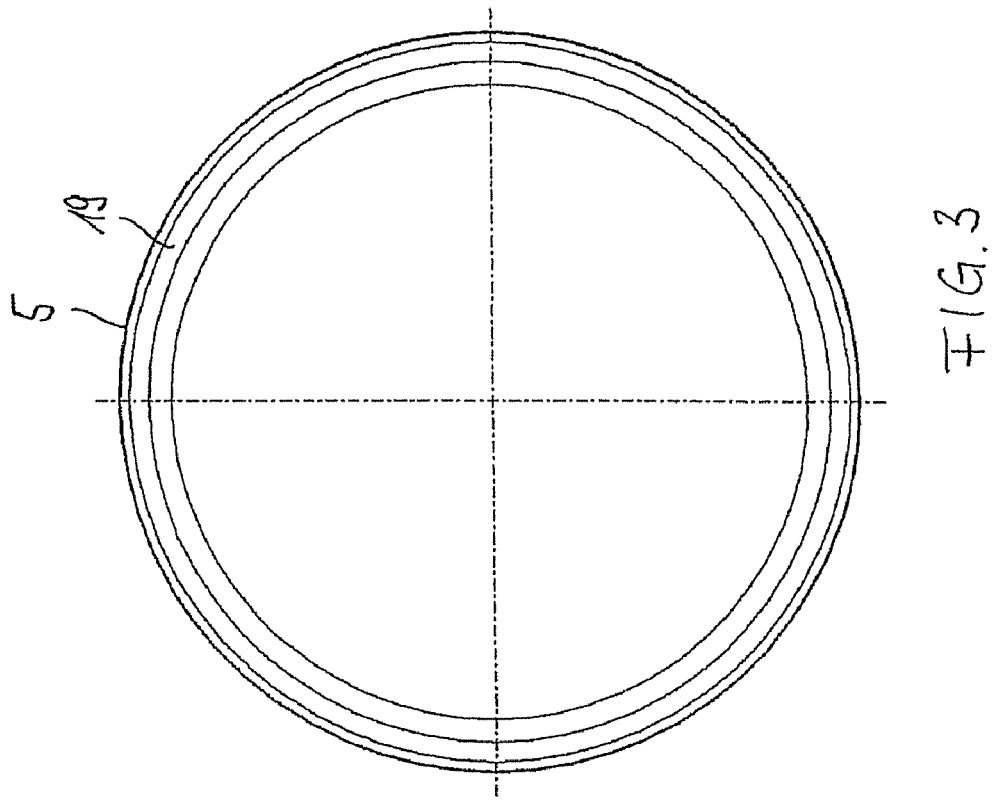
FIG. 3 is a plan view of a plate spring according to FIG. 1.

FIGS. 1 to 4 will be described jointly below. They show an assembly comprising an actuator 2 and a plate package 3 in a friction coupling. The assembly has a longitudinal axis of rotation (A). Between the actuator 2 and the plate package 3 there are axially arranged a ball bearing 4 for disconnecting the torque and a plate spring 5 for loading the plate package, with said components being axially connected in series. In addition to the plate package 3, the friction coupling comprises a coupling carrier (not shown) in which outer plates 24 of the plate package 3 are held in a rotationally fast and axially displaceable way, as well as a coupling hub on which inner plates 25 of the plate package 3 are supported in a rotationally fast and axially displaceable way. As will be described below, the actuator 2 with the plate package 3 is inserted into a differential assembly of a motor vehicle where it serves to distribute torque, if required, between two sideshafts.

The actuator 2 is provided in the form a ball ramp assembly. The ball ramp assembly 2 comprises a first disc 6 which has to be accommodated in a rotationally fast way in a housing (not shown) and a rotatable second disc 7 arranged coaxially relative thereto. The first disc is provided in the form of a supporting disc 6 which is axially supported relative to the housing, whereas the second disc is provided in the form of a setting disc 7 which is rotatingly drivable by an electric motor (not shown) and which is axially displaceable relative to the supporting disc 6. To prevent the supporting disc 6 from rotating, a securing pin 10 is provided which has to be inserted into a corresponding bore in the housing.

In opposed end faces 8, 9 of the two discs 6, 7, there are provided ball grooves 12, 13 whose pitches extend in opposite directions. The ball grooves 12, 13 extend in the circumferential direction, with two opposed ball grooves 12, 13 forming a pair and jointly accommodating a ball. The balls are positioned in different sectional planes and therefore cannot be seen in the present illustration. Thus, one ball 60 is shown in hidden lines merely for clarity and completeness. The balls are guided in a cage 14. Overall, it is possible to provide three or more pairs of ball grooves 12, 13 and a corresponding number of balls which are uniformly circumferentially distributed. The depth of a pair of ball grooves 12, 13 is variable around the circumference, so that a rotation of the setting disc 7 relative to the supporting disc 6 leads to an axial displacement. To achieve the rotational movement of the setting disc 7, the latter, on its outer circumferential face, is provided with outer teeth 15. The outer teeth 15 are engaged by a pinion (not shown) which is rotatably supported in the housing and connected drivewise to the electric motor. The electric motor is operationally connected to a control device for controlling the driving dynamics of the motor vehicle and is controlled thereby.

The ball bearing 4 is provided in the form of an axial deep groove ball bearing and comprises a first bearing race 28, a second bearing race 29, balls 16 axially held in a common plane between the two bearing races, as well as a cage 17 in which the balls are circumferentially distributed. The first bearing race 28 is produced so as to be integral with the setting disc 7 which, in its end face facing the plate package 3, comprises a first bearing groove 18 receiving the balls 16. The second bearing race 29 is produced so as to be integral with the plate spring 5 which, in its end face facing the ball ramp assembly, comprises a second bearing groove 19 in which the balls 16 are accommodated. The balls 16 form circumferentially distributed pressure points around which the plate spring, if viewed in a longitudinal section—is pivotable. On its side opposed to the balls 16, the plate spring 5 comprises a conical pressure face 20 which axially loads a pressure plate 22. The conical pressure face 20 is arranged in such a way that it opens radially outwardly. It can be seen that the bearing groove 19 is positioned on a greater radius than the radially inner annular portion 23 of the pressure face 20, which inner annular portion 23, in the unactuated condition of the ball ramp assembly, is in contact with the pressure plate 22. The pressure face 20 thus loads the plate package 3 initially radially inwardly by a smaller annular face, with the contact face, with an increasing axial force, widening radially outwardly. To achieve an accurate control, the plate spring 5 is designed in such a way that it comprises a linear characteristic over the entire operating range of the friction coupling.

It can be seen that the two discs 6, 7, the axial ball bearing 4, the plate spring 5 and the plate package 3 are arranged coaxially relative to the axis of rotation A, with the setting disc 7 being radially supported via the balls of the ball ramp assembly 2 only. Furthermore, the plate spring 5 is held only by the balls 16 of the axial ball bearing 4 so as to be centered on the axis of rotation. This embodies a compact design with a small number of parts. Furthermore, it can be seen that the balls 16 are positioned approximately on the same radius as the balls of the ball ramp assembly 2, which results in a direct introduction of force and a small size in the radial direction.

In addition to the pressure plate 22, the plate package 3 comprises outer plates 24 to be connected to the coupling carrier in a rotationally fast way and inner plates 25 to be connected to the coupling hub in a rotationally fast way. The outer plates 24 and the inner plates 25 are arranged so as to alternate in the axial direction. The plate package 3 is terminated by an abutment plate 26 which is axially supported against a supporting face of the coupling carrier. To return the ball ramp assembly 2, a plurality of circumferentially distributed return springs 27 are provided which are axially supported against the abutment plate 26 and axially load the pressure plate 22 against the operating direction of the plate spring 5. In this example, the return springs 27 comprise helical springs.

The assembly functions as follows: In the starting condition, i.e. when the friction coupling is fully open, the two discs 6, 7 are in the closest possible position relative to one another. When the setting disc 7 is rotated as required, the balls 60 run in the ball grooves 12, 13 into regions with a smaller depth. The discs 6, 7 are thus spread apart, with the setting disc 7 being axially displaced towards the plate package 3 and loading same via the axial ball bearing 4 and the plate spring 5. In accordance with the rotation of the setting disc 7, the friction coupling is locked by a predetermined amount, with the rotating coupling hub subsequently being coupled to the stationary coupling carrier. For opening the friction coupling again, a setting disc 7 is actuated in the opposite direction. The return spring 27 in the form of helical springs ensure that the setting disc 7, with the electric motor being in an unactuated condition, is displaced into its starting condition towards the supporting disc 6.

Figure 5:
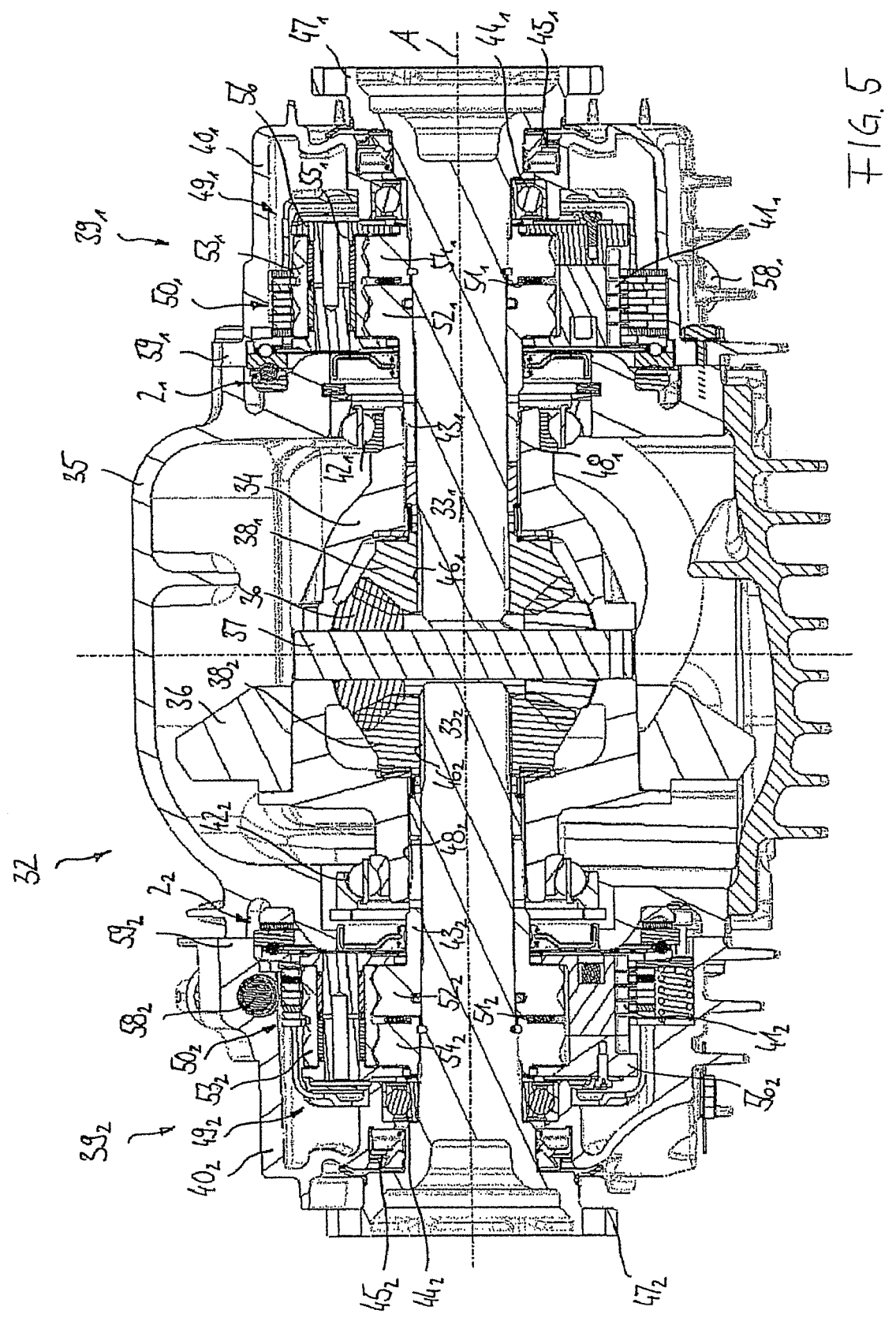

FIG. 5 shows an inventive differential assembly 32 for variably distributing torque between two axle shafts in the driveline of a motor vehicle. The differential assembly 32 is driven by a multi-step reduction gear (not shown) and the incoming torque is distributed to sideshafts 33.sub.1, 33.sub.2. The differential assembly 32 comprises a differential carrier 34 which is supported in a stationary differential housing 35 by rolling contact bearings 42.sub.1, 42.sub.2, so as to be rotatable around the axis of rotation A. A crown gear 36 driven by the driveshaft is secured to the differential carrier 34. A plurality of differential gears 36 are rotatably supported in the differential carrier 34 on journals 37 which are positioned perpendicularly relative to the axis of rotation A and which rotate together with the differential carrier 34. Two sideshaft gears 38.sub.1, 38.sub.2 which serve to transmit torque to the sideshafts 33.sub.1, 33.sub.2 engage the differential gears 36.

To one side of the differential housing 35, so as to adjoin same, there are provided two drive modules 39.sub.1, 39.sub.2 which correspond to one another in respect of design and mode of functioning, so that they can be described jointly. In the drawing, any components which correspond to one another have been given the same reference numbers with different indices.

The drive modules 39 each comprise a housing 40 in which an associated sideshaft 33 is rotatably supported on the axis of rotation A, as well as a hollow shaft 43 coaxially and rotatably supported on the sideshaft 33. The sideshaft 33 is rotatably supported by a rolling contact bearing 44 in the housing 40 and outwardly sealed by a shaft sealing ring relative thereto. At its input end, the sideshaft 33 comprises longitudinal teeth 46 for being connected to the sideshaft gear 38 in a rotationally fast way. At its output end, the sideshaft 33 comprises a flange 47 for being connected to the axle shaft of a motor vehicle (not shown). The hollow shaft 43 is supported by a friction bearing on the sideshaft 33 and comprises longitudinal teeth 48 which are inserted in a rotationally fast way into counter teeth of the differential carrier 34. The drive modules, together with their respective housings 40 are attached to the differential housing 35 via flange connections 59.

Furthermore, the drive modules 39, in the form of assemblies, each comprise a transmission stage 49 which is able to rotate around the axis of rotation A, an actuator 2 according to FIG. 1, as well as a friction coupling 50 which can be actuated by said actuator 2 and of which the plate package 3 can be seen in FIG. 1 in the form of a detail. The actuator 2 serves to operate the friction coupling 50 which, in turn, controls the transmission stage 49.

The transmission stage 49 comprises a first sun gear 52 produced so as to be integral with the hollow shaft 43, a plurality of planetary gears 53 whose teeth engage those of the first sun gear 52, as well as a second sun gear 54 whose teeth engage those of the planetary gears and which, via longitudinal teeth, is connected in a rotationally fast way to the sideshaft 33. The planetary gears 53 are produced in one piece and comprise two toothed portions, one of which engages the first sun gear 52 and the other one the second sun gear 54. Between the two sun gears, there is provided an axial bearing 51. In order to achieve a change in speed between the sideshaft 33 and the hollow shaft 43, the two sun gears 52, 54 have different numbers of teeth, with the numbers of teeth of the planetary gears 53 and the sun gears 52, 54 having been selected to be such that between the sideshaft 33 and the second shaft 43 there is achieved a speed differential of up to 15%. The planetary gears 53 are rotatably received on journals 55 in a web element 56 by needle bearings 57. The web element 56 is basket-shaped and largely closed towards the outside. On the outer circumferential face of the web element 56 there are provided engaging means 41 which are engaged in a rotationally fixed way by the inner plates 25 of the friction coupling 50. The web element 56 thus forms the coupling hub for the plate package 3 shown in FIG. 1. The coupling carrier for said plate package 3 is formed by the respective housing 40 in which the outer plates 24 are held in an axially displaceable and rotationally fixed way.

By actuating the friction coupling 4, the rotating web element 56 of the transmission stage 49 is braked relative to the stationary housing 40 in order to tap off an additional torque directly at the differential carrier 34 and transmit same via the hollow shaft 43 and the transmission stage 49 to the sideshaft 33. In the housing 40, there is fixed a force sensor 58 against which there is circumferentially supported a certain number of outer plates 24 by a cam. The two central ones of the four outer plates 24 comprise cams which load the force sensor 23. The two axially outermost outer plates 24 are directly held in the housing 40 in a rotationally fast way. At their ends diametrically opposite the force sensor 58, all the outer plates 24 are pivotably supported on a pin which is fixed in the housing 40. The pin is located in a different sectional plane, so that it cannot be seen here. The force sensor 58 is held in the housing 40 in such a way that, as a result of the friction coupling 50 being actuated, it is force-loaded by the cam in an operating direction extending at a distance from and transversely to the longitudinal axis A. On the basis of the forces measured by the force sensor 58, the coupling moment is calculated in a computer unit (not shown). The coupling moment serves as the input factor for a control system for controlling the driving dynamics of the vehicle, which control system regulates the variable distribution of the driving moment to the driving axles. In the present embodiment, the force sensor of the righthand drive assembly is positioned in a different sectional plane, so that it is not visible.

Overall, the inventive differential assembly with the inventive friction coupling with actuator is advantageous in that any interference such as different thermal expansion coefficients of the components of the friction coupling only have a slight effect on the controllability of the friction coupling. Furthermore, as a result of an increase in the elasticity of the assembly consisting of the actuator and the friction coupling, there is achieved a flat characteristic curve of the coupling moment as a function of the angle of rotation of the setting disc. This means that the coupling moment can be set exactly as required and it is easy to control the driving dynamics of the motor vehicle.

Figure 6:
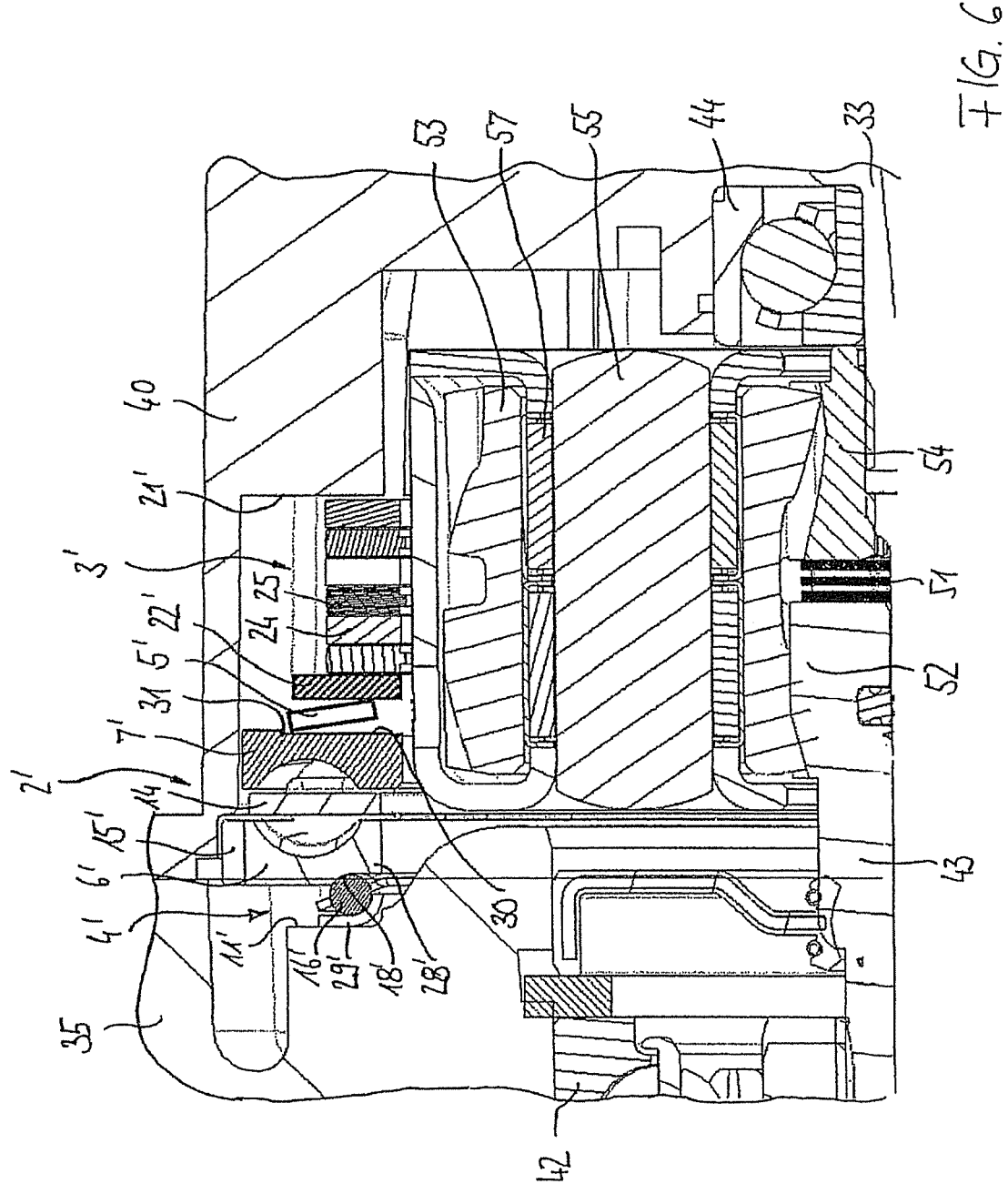
FIG. 6 is half a longitudinal section through an inventive friction coupling with actuator in a second embodiment as part of a drive assembly, in the form of a detail, according to an embodiment of the invention.

FIG. 6 shows a second embodiment of an inventive assembly comprising a friction coupling and an actuator; it is shown as a detail of a drive assembly for variably distributing torque, which drive assembly corresponds to that shown in FIG. 5. To that extent, reference is made to the above description, with identical components having been given the same reference numbers, and with modified components having an index of one. The present embodiment is characterized in that the axially supported first disc 6' is rotatingly drivable by the electric motor, whereas the axially displaceable second disc 7' is held in the housing 40 in a rotationally fixed and axially displaceable way. The first disc 6' thus assumes both the setting and the supporting function. The first disc 6' is supported by a ball bearing 4' relative to the housing 35, 40 on the axis of rotation A. The ball bearing 4' is provided in the form of an axial angular ball bearing which centers the first disc 6' both axially and radially on the axis of rotation A. The ball bearing 4' comprises a first bearing race 29' which is axially supported on a supporting face 11' and which is positioned on a cylindrical portion of the housing 35 as well as a second bearing race 28' formed by the first disc 6'. For this purpose, the disc 6', in an end face facing the first disc 6', comprises a bearing groove 18' in which there run the balls 16 of the ball bearing.

It is shown in FIG. 6 that the first bearing race 28' is formed in an end face of the rotatingly drivable disc 6' which faces away from the axially displaceable disc 7'. The balls 16' of the ball bearing 4' are smaller than the balls of the ball ramp assembly 2' (shown best in FIGS. 1 and 5). The rotatingly drivable and axially supported disc 6' has a central bore, wherein the first bearing race 28' is formed radially in a region between the central bore and a portion of the axially supporting disc 6' which is defined by a greatest groove depth of the ball grooves 18'. The centers of the balls 16' of the ball bearing 4' define a first diameter and the centers of the balls of the ball ramp assembly 2' define a second diameter (balls are seen best in FIGS. 1 and 5). It can be seen in FIG. 6 that the first diameter of the balls 16' of the ball bearing 4' is smaller than the depth of the ball grooves for the balls of the ball ramp assembly. Thus, the first diameter of the balls 16' of the ball bearing 4' is smaller than the second diameter of the balls of the ball ramp assembly 2'.

The second disc 7' axially adjoins the first disc 6' and is centered on the axis of rotation A entirely via the balls (not visible) of the ball ramp assembly. The plate spring 5' is axially supported on the reverse side of the second disc 7' on the one hand and on a pressure plate 22' loading the plate package 3' on the other hand. In the end face of the second disc 7, which end face faces the plate package 3', a centering mechanism in the form of an axial recess 30 is provided in which the plate spring 5' is positioned so as to be centered on the axis of rotation A. The axial recess 30 forms a continuous shoulder 31 against which the plate spring 5' is radially supported via an outer edge. The plate package 3' is axially supported on a supporting face 21 of the housing 40, which supporting face 21' is arranged opposite the supporting face 11. The following components, i.e. the ball bearing 4', the first disc 6', the second disc 7', the plate spring 5', the pressure plate 22' and the plate package 3' are axially connected in series and, together with the housing 40 and the housing 35, form a closed force application circuit. By using the plate spring 7' in the force flow, there are obtained the above-mentioned advantages of an increase in the elasticity of the assembly and thus good controllability. However, it is understood that the use of the plate spring 7' is optional and that the invention would also work without the plate spring 7'.

FIG. 7 shows a second embodiment of an inventive friction coupling with actuator. It is shown as a detail of a drive assembly for variably distributing torque, which drive assembly corresponds to that shown in FIG. 5. To that extent, reference is made to the above description, with identical components having been given the same reference numbers and with modified components having two indices. In the present embodiment—as in the embodiment according to FIG. 6 to whose description reference is hereby made—the axially supported first disc 6" is rotatingly drivable by the electric motor, whereas the axially displaceable second disc 7" is held in the housing 40" in a rotationally fast and axially displaceable way. In contrast to the above embodiment, the plate spring 5" is axially arranged between the plate package 3" and the supporting face 21" formed by the housing 40". The plate spring 5" is positioned in an annular recess 30" of the housing 40", so that it is radially centered on the axis of rotation A. The recess 30" thus serves as a centering element. Between the plate spring 5" and the supporting face 21", there is axially connected a pressure plate 22". The following components, i.e. the ball bearing 4", the first disc 6", the second disc 7", the plate package 3", the plate spring 5" and the pressure plate 22" are axially connected in series and, together with the housing 40" and the housing 35", form a closed force application circuit. By using the plate spring 7" in the force flow, the above-mentioned advantages of an increase in elasticity of the assembly and easy controllability are obtained.

While the invention has been described in connection with several embodiments, it should be understood that the invention is not limited to those embodiments. Rather, the invention covers all alternatives, modifications, and equivalents as may be included in the spirit and scope of the appended claims.

What is claimed is:

1. A friction coupling assembly comprising:
   an actuator in the form of a ball ramp assembly with two discs which are arranged coaxially relative to one another, of which one is axially supported and the other one is axially displaceable, wherein the two discs, on their end faces facing one another, each comprise a plurality of ball grooves which, in opposed circumferential directions, comprise an increasing depth, wherein in pairs of opposed ball grooves there are received balls via which the two discs are axially supported;
   a plate package arranged coaxially relative to the discs and having outer plates to be connected in a rotationally fixed way to a coupling carrier and inner plates to be connected in a rotationally fixed way to a coupling hub which is rotatable relative to the coupling carrier, wherein the outer plates and the inner plates are arranged so as to alternate in the axial direction;

wherein the axially supported disc is rotatingly drivable around an axis of rotation by an electric motor, and wherein the axially displaceable disc is held in a rotationally fixed way relative to the coupling carrier;

a ball bearing for axially supporting the rotatingly drivable disc relative to a supporting face, wherein a first bearing race of the ball bearing is integrally formed with the rotatingly drivable disc.

2. An assembly according to claim 1, wherein the first bearing race is formed in an end face of the rotatingly drivable disc, which faces away from the axially displaceable disc.

3. An assembly according to claim 1, wherein the ball bearing comprises a second bearing race which is axially supported against a first supporting face.

4. An assembly according to claim 3, wherein said first supporting face is part of a housing of said coupling assembly.

5. An assembly according to claim 1, wherein balls of the ball bearing are smaller than the balls of the ball ramp assembly.

6. An assembly according to claim 1, wherein the axially supported disc has a central bore, wherein the first bearing race is formed radially in a region between said central bore and a portion of the axially supporting disc which is defined by a greatest groove depth of the ball grooves.

7. An assembly according to claim 1, wherein the centers of the balls of said ball bearing define a first diameter and the centers of the balls of said ball ramp assembly define a second diameter, wherein the first diameter is smaller than the second diameter.

8. An assembly according to claim 1, wherein the ball bearing is provided in the form of an axial angular contact ball bearing.

9. An assembly according to claim 1, wherein the axially displaceable disc is centered on the axis of rotation by means of only the balls of the ball ramp assembly.

10. An assembly according to claim 1, wherein there are provided a spring mechanism for returning the displaceable disc, the spring mechanism being axially supported against a second supporting face which second supporting face axially supports the plate package and which spring mechanism is also at least indirectly supported against an end face of the displaceable disc, which end face faces the plate package.

11. An assembly according to claim 10, wherein the spring mechanism comprises a plurality of helical springs which are distributed around the circumference of the plate package.

12. A differential assembly for variably distributing torque in the driveline of a motor vehicle, comprising:

a differential drive with a rotatingly drivable differential carrier and two sideshafts which are supported on an axis of rotation and which are drivingly connected to the differential carrier via a differential gear set, wherein there is formed a first driveline between the differential carrier and each one of the sideshafts;

per sideshaft, a transmission stage which, is drivingly connected to the differential carrier on the one hand and to one of the sideshafts on the other hand and which forms part of a second driveline which is functionally parallel relative to the first driveline; and per transmission stage, a coupling assembly according to claim 1.

\* \* \* \* \*